United States Patent [19]
Gravino

[11] Patent Number: 5,145,081
[45] Date of Patent: Sep. 8, 1992

[54] CAPLESS CLOSURE FOR A FUEL TANK FILLER PIPE

[75] Inventor: Marc C. Gravino, Rockford, Ill.
[73] Assignee: Trilby, Ltd., Rockford, Ill.
[21] Appl. No.: 592,180
[22] Filed: Oct. 3, 1990
[51] Int. Cl.$^5$ .............................................. B65B 31/00
[52] U.S. Cl. .................................................. 220/86.2
[58] Field of Search .................... 220/86.2, 85 F, 211, 220/315, 319, DIG. 33, 86.2

[56] References Cited

U.S. PATENT DOCUMENTS

| | | | |
|---|---|---|---|
| 1,842,992 | 1/1932 | Mallet | 220/86.2 |
| 1,902,456 | 3/1933 | Matthews | 220/86.2 |
| 2,503,031 | 4/1950 | Davidson | 220/35 |
| 3,334,779 | 8/1967 | Smith | 220/86 |
| 3,478,922 | 11/1969 | Mole | 220/86 |
| 4,091,959 | 5/1978 | O'Banion | 220/304 |
| 4,265,752 | 5/1981 | O'Banion | 210/172 |
| 4,702,386 | 10/1987 | Boehmer et al. | 220/85 F X |
| 4,712,709 | 12/1987 | Horvath et al. | 220/334 |
| 4,715,509 | 12/1987 | Ito et al. | 220/86.2 |
| 4,762,247 | 8/1988 | Temmesfeld | 220/86.2 X |
| 4,817,813 | 4/1989 | Krause | 220/86 |

Primary Examiner—Steven M. Pollard
Attorney, Agent, or Firm—Leydig, Voit & Mayer

[57] ABSTRACT

A hinged flapper valve is mounted to swing between open and closed positions with respect to a fill opening formed through a base mounted in the outer end portion of a motor vehicle fuel tank filler pipe, the flapper being swung to its open position as an incident to insertion of a fuel nozzle into the filler pipe. A locking ring is rotatably supported on the base for turning between locked and unlocked positions and, when in its unlocked position, frees the flapper to swing to its open position. When the locking ring is turned to its locked position, it draws the flapper into tight engagement with the base to seal the fill opening therein and to hold the flapper securely closed. Turning of the locking ring between its locked and unlocked positions may be effected automatically by a motor adapted to be controlled from inside the vehicle.

13 Claims, 3 Drawing Sheets

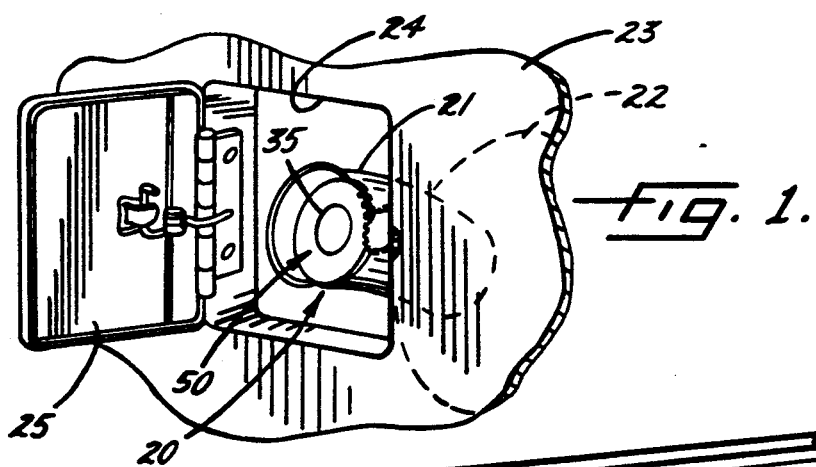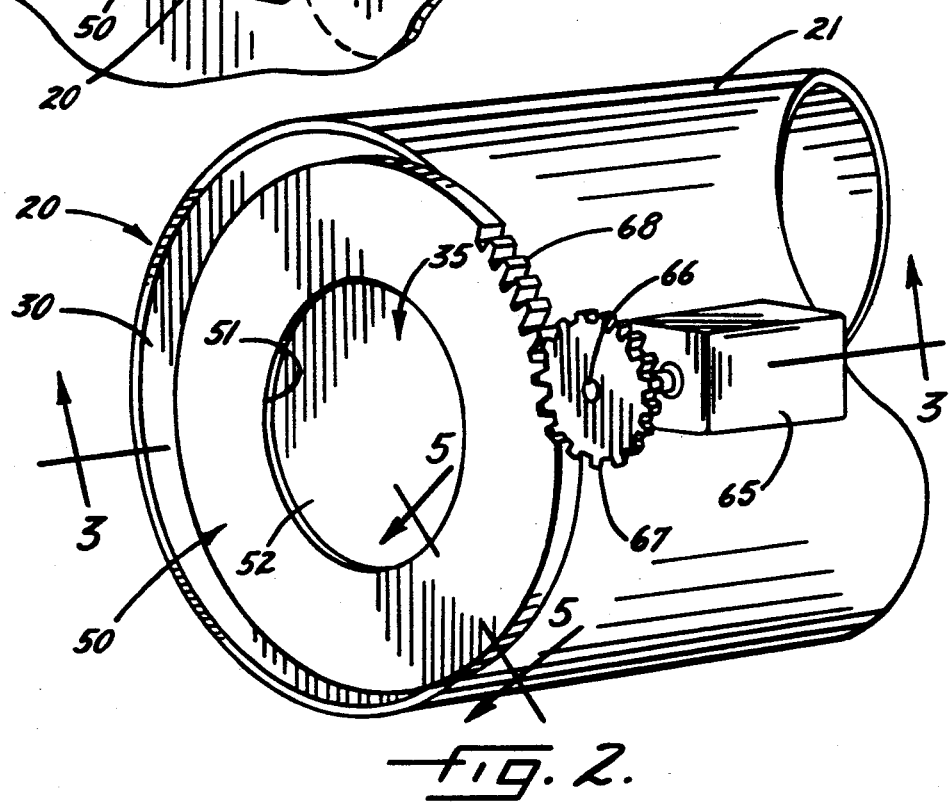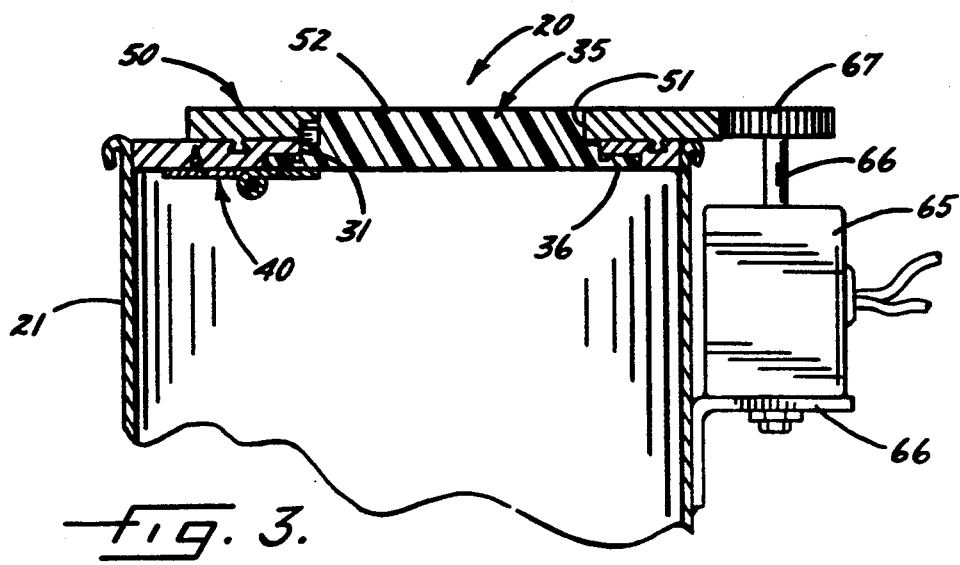

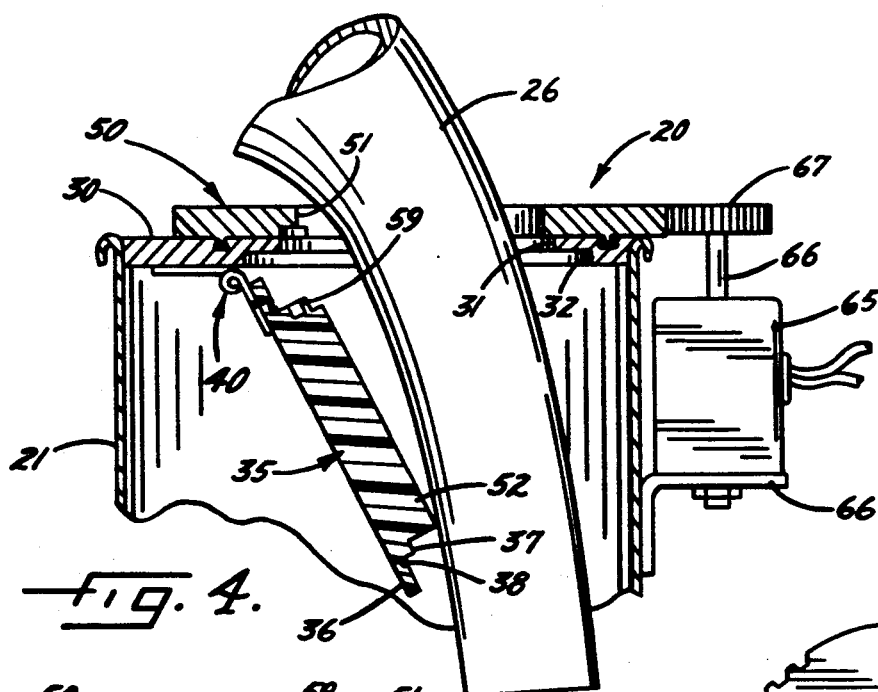
_fig. 4._
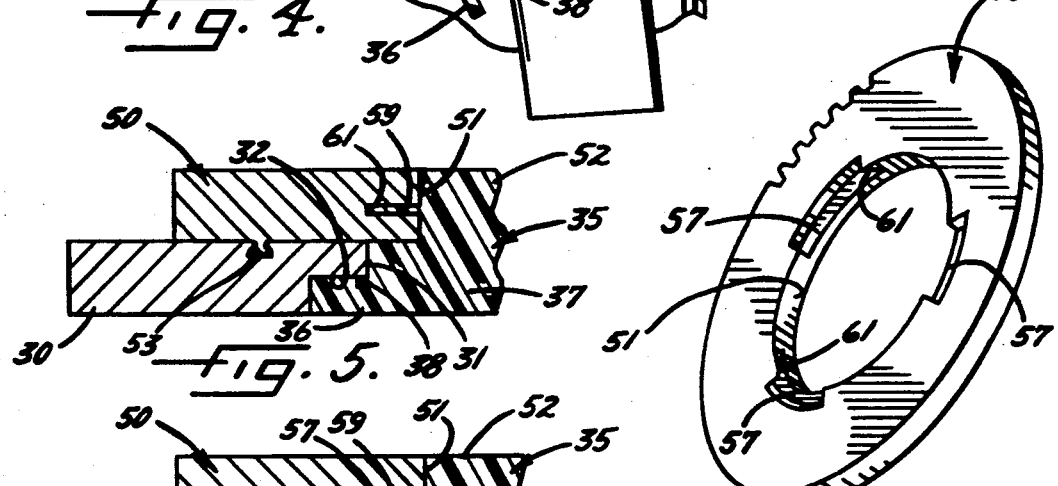
_fig. 5._
_fig. 8._
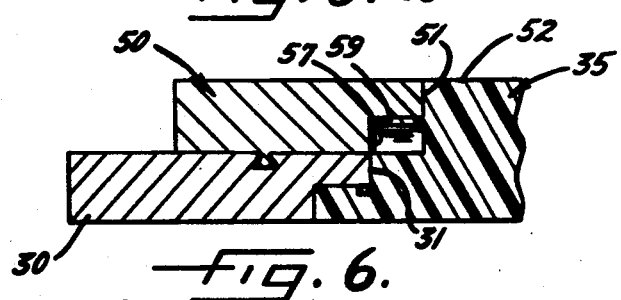
_fig. 6._
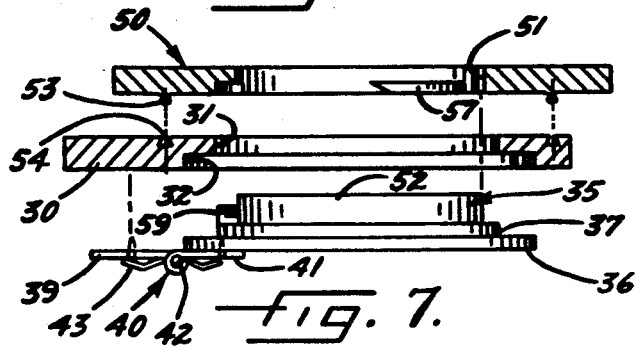
_fig. 7._
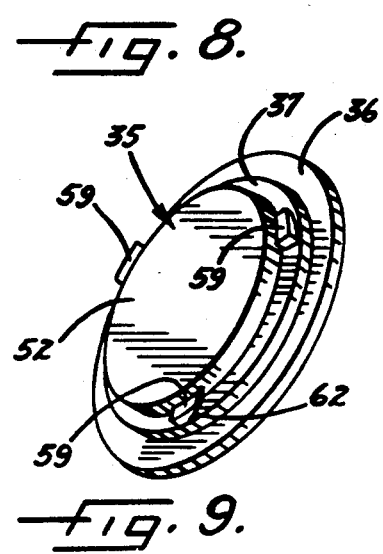
_fig. 9._

CAPLESS CLOSURE FOR A FUEL TANK FILLER PIPE

BACKGROUND OF THE INVENTION

This invention relates to a closure for the filler pipe of a vehicle fuel tank which is adapted to be filled by a pump nozzle inserted into the outer end portion of the filler pipe.

Conventionally, filler pipes are closed by screw-on caps which must be removed manually to fuel the vehicle and then replaced when the fueling is complete. On occasion, a driver forgets to replace the cap and thus the cap becomes lost when the vehicle leaves the fueling station. Even if the cap is tethered to the vehicle, a potentially hazardous situation is created if the driver fails to replace the cap and drives away with the filler pipe in an open condition. Moreover, to discourage theft of fuel by siphoning, a conventional cap must either be equipped with a key-operated lock or must be housed in a compartment which is closed by a lockable fuel door.

The prior art contemplates filler pipe closures which differ from conventional screw-on caps. For example, Davidson U.S. Pat. No. 2,503,031 discloses a capless system with a spring-loaded flapper valve which is adapted to be pivoted to an open position by the fuel nozzle. Smith U.S. Pat. No. 3,334,779 discloses a capless system in which a closure is formed by a diaphragm valve having multiple slits and adapted to be forced open by the fuel nozzle. A concept somewhat similar to that of the Smith patent is disclosed in Mole U.S. Pat. No. 3,478,922. In these systems, however, there is no effective provision for locking the flapper valve or the diaphragm valve in a securely closed and sealed position.

Other somewhat unconventional fuel closure devices are disclosed in Horwath et al U.S. Pat. No. 4,712,709 and Krause U.S. Pat. No. 4,817,813. The Horwath et al system is for automatic filling of the fuel tank from the bottom thereof while the Krause system includes a bulky mechanism having a filling opening which is rotated into and out of registry with the filler pipe.

SUMMARY OF THE INVENTION

The primary aim of the present invention is to provide a capless closure for a conventional fuel filler pipe, the closure being adapted to be opened by the fuel nozzle and being adapted to be locked, either manually or automatically, in a securely closed and sealed position after the nozzle has been withdrawn from the filler pipe.

A more detailed object of the invention is to achieve the foregoing through the provision of a closure having a nozzle-actuatable valve which is normally locked closed but which may be released for opening by simply turning a control member either manually or with a power-operated actuator.

In a still more detailed sense, the invention resides in a closure having a flapper valve which is supported to pivot between open and closed positions relative to a filling opening for the filler pipe. A locking ring normally holds the flapper locked in its closed position and may be turned to an unlocked position to release the flapper and permit the flapper to be swung to its open position by the fuel nozzle as the nozzle is inserted into the filler pipe. Upon completion of the fueling and withdrawal of the nozzle, the flapper closes automatically and then the locking ring may be turned to a locked position to seal the flapper tightly in its closed position.

The invention also is characterized by the provision of a filler pipe closure which blends attractively and unobtrusively with a vehicle fender without need of a fuel door for concealing and safeguarding the closure.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a motor vehicle having a fuel filler pipe equipped with one embodiment of a new and improved closure incorporating the unique features of the present invention.

FIG. 2 is an enlarged fragmentary perspective view showing the filler pipe and the closure.

FIG. 3 is a fragmentary cross-section taken substantially along the line 3—3 of FIG. 2 and shows the flapper of the closure in its closed position.

FIG. 4 is a view similar to FIG. 3 but shows the flapper in its open position.

FIG. 5 is an enlarged fragmentary cross-section taken substantially along the line 5—5 of FIG. 2 and shows the flapper locked in its closed position.

FIG. 6 is a view similar to FIG. 5 but shows the flapper unlocked and free to swing to its open position.

FIG. 7 is a cross-sectional view showing the major components of the closure exploded away from one another.

FIG. 8 is a perspective view of the locking ring.

FIG. 9 is a perspective view of the flapper.

DETAILED DESCRIPTION OF THE PREFERRED EMBODIMENTS

Figure 10:
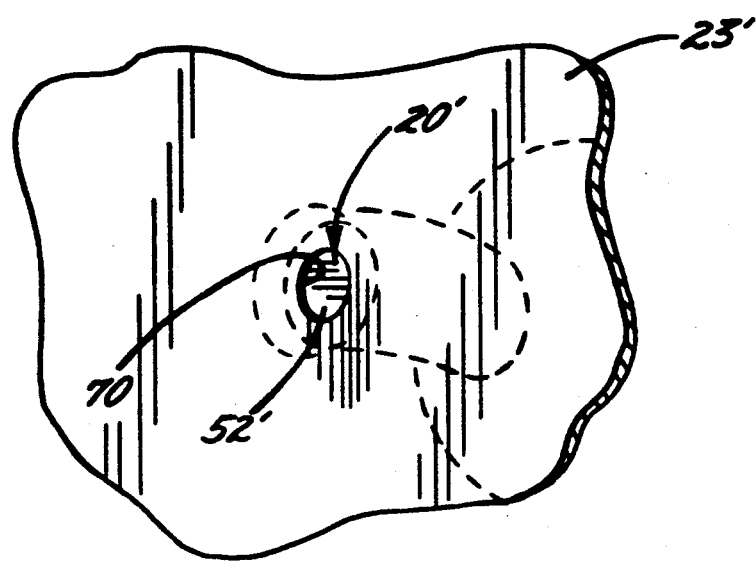
FIG. 10 is a fragmentary perspective view generally similar to FIG. 1 but showing another embodiment of the closure of the invention.

For purposes of illustration, the closure 20 of the present invention is shown in the drawings in conjunction with the filler pipe 21 of the fuel tank 22 of a motor vehicle such as an automobile. In FIG. 1, the filler pipe has been shown as located within a rear fender 23 of the vehicle and is accessible through an opening 24 in the fender. Normally, the opening is closed by a hinged fuel door 25.

The present invention contemplates the provision of a new and improved filler pipe closure 20 which eliminates the need for removing and replacing a conventional screw-on fuel cap, which opens and closes automatically as an incident to insertion of a fuel nozzle 26 into and withdrawal of the nozzle from the filler pipe 21 and which, when closed, may be securely locked and sealed to prevent unauthorized access to the tank 22 and to prevent road contaminants from entering the tank. As will become more apparent subsequently, the closure lends itself to automatic operation from inside the vehicle and, in addition, the closure may be located in smooth blended relation with the fender 23 in such a manner as to make the closure virtually unnoticeable.

More specifically, the closure 20 includes a flat and circular base member 30 (FIG. 3) which herein is telescoped into the outer end portion of the filler pipe 21 and is welded or otherwise secured rigidly to the pipe. In this particular instance, the outer side of the base 30 is substantially flush with the outer end of the filler pipe 21. The base may be made of steel or other suitable material.

Formed through the base 30 is a circular fill opening 31 (FIG. 7) of suitable diameter to accept the nozzle 26. While the fill opening could be formed through the central portion of the base, it herein is eccentric with respect to the base. Concentric with the fill opening and formed in the inner side of the base is a circular counterbore 32 (FIG. 7).

A valve member which herein is in the form of a flapper 35 is adapted to swing between open and closed positions with respect to the fill opening 31 in the base 30 and, when closed, is adapted to seat against the axially facing surface of the counterbore 32. For simplicity, the flapper has been shown as being made of a single piece of hard plastic. It should be appreciated, however, that the flapper may be made of other materials as may be required to comply with governmental standards.

The flapper 35 includes an inner circular plate 36 (FIG. 9) having a diameter just slightly smaller than the outer diameter of the counterbore 32 in the base 30. A circular ledge 37 on the outer side of the plate is sized to telescope closely into the fill opening 31 in the base. When the flapper is in its closed position, the fill opening 31 is sealed by an O-ring 38 (FIGS. 4 and 5) contracted around the inner end portion of the ledge 37 and received in a groove in the outer side of the plate 36. The O-ring seats against the axially facing surface of the counterbore 32.

To support the flapper 35 for swinging between its open and closed positions, one leaf 39 (FIG. 7) of a hinge 40 is connected to the inner side of the base 30 while the other leaf 41 is connected to the inner side of the plate 36 of the flapper. The two hinge leaves are pivotally interconnected by a pin 42 which supports a torsion spring 43. The latter acts against the hinge leaves to urge the flapper to swing outwardly about the pin to its closed position.

With the closure 20 as described thus far, filling of the fuel tank 22 may be effected simply by inserting the nozzle 26 through the fill opening 31 of the base 30 to cause the nozzle to engage the flapper 35 and swing the flapper to its open position shown in FIG. 4 so as to permit the nozzle to enter the outer end portion of the fill pipe 21. Once the fueling has been completed and the nozzle has been withdrawn, the hinge spring 43 automatically returns the flapper to its closed position. Although the spring holds the flapper closed, the spring force is not sufficient to insure a seal of high integrity between the flapper and the base. When the closure is subjected to road vibrations, the lack of a high integrity seal can result in moisture and dirt entering the fill pipe and also can lead to the escape of fumes out of the pipe.

In carrying out the invention, means are provided for locking the flapper 35 securely and tightly in its closed position while being selectively operable to release the flapper for swinging to its open position. These means preferably comprise a locking ring 50 (FIGS. 2, 4 and 8) supported on the outer side of the base 30 to turn between locked and unlocked positions. The locking ring is circular and is formed with a central circular opening 51 which is concentric with and somewhat smaller in diameter than the fill opening 31 in the base 30. A cylindrical disc-like member 52 (FIG. 9) projects outwardly from the ledge 37 of the flapper 35 and when the flapper is closed, is received in the opening 51 in the ring 50 with a close running fit so as to help support the ring for turning on the base 30 and about an axis coinciding with the axis of the fill opening 31. In addition, the ring is supported for turning by an annular rib 53 (FIG. 7) on the inner side of the ring projecting with a snap fit into an annular groove 54 in the outer side of the base. The rib 53 and the groove 54 also coact to prevent the locking ring 50 from separating axially from the base 30.

As shown in FIG. 8, a series (herein, three) of angularly spaced notches 57 is formed in the inner side of the locking ring 50 adjacent the periphery of the opening 51. In this instance, the notches open both axially inwardly and radially inwardly but do not extend through to the outer side of the ring. The notches are adapted to receive three angularly spaced lugs 59 (FIG. 9) formed integrally with and projecting radially inwardly from the periphery of the disc 52 of the flapper 35. The angular width of each lug is substantially less than the angular width of the respective notch.

When the locking ring 50 is in its unlocked position shown in FIG. 6, the relatively narrow lugs 59 are substantially centered within and are aligned angularly with the comparatively wide notches 57. As a result, the lugs may swing inwardly from the notches to permit the flapper 35 to swing to its open position.

When the ring 50 is turned clockwise (FIG. 2), the notches 57 become angularly misaligned with the lugs 59, and end portions of the notches interlock with the lugs to securely hold the flapper 35 in its closed position. Advantageously, one end portion of each notch is formed with an angled undercut as indicated at 61 in FIG. 8. The inner side of each lug is formed with an inclined ramp surface as indicated at 62 in FIG. 9. When the ring is turned clockwise to its locked position, the angled undercuts 61 cam against the inclined ramps 62 and draw the flapper 35 outwardly to cause the O-ring 38 to seal tightly against the axially facing surface of the counterbore 32 in the base 30. Engagement of the lugs 59 with the undercuts 61 locks the flapper in its closed position until the ring is turned counterclockwise to its unlocked position to free the undercuts from the lugs and allow the lugs to swing inwardly from the notches 57. Thus, contamination is prevented from entering the filler pipe 21 and fumes are prevented from escaping.

In the simplest form of the closure 20, the locking ring 50 may be manually turned between its locked and unlocked positions by means of manually engageable tabs (not shown) or the like on the locking ring. In a more sophisticated form, the locking ring is turned automatically as, for example, by a small reversible motor 65 secured to a bracket 66 (FIG. 3) on the outside of the filler pipe 21 and connected to the electrical system of the vehicle. The rotary output shaft 66 of the motor carries a pinion 67 which meshes with gear teeth 68 (FIG. 3) formed around a portion of the outer periphery of the locking ring 50, the toothed portion projecting radially beyond the outer end of the filler pipe 21 by virtue of the eccentricity of the ring and the filler pipe. By actuating an electrical switch in the vehicle, the motor 65 can be energized to cause the pinion 66 to turn the locking ring 50 to its unlocked position and then can be reversed to effect turning of the ring to its locked position.

As an alternative to actuating the locking ring 50 from inside the vehicle by energizing the motor 65, push-pull cable means (not shown) could be connected to the ring and manually actuated from inside the vehicle to turn the ring. Such cable means may be provided either alone or in conjunction with the motor 65. In the latter case, the cable means would serve as an emergency back-up in the event of failure of the motor.

In cases where the locking ring 50 is capable of being actuated solely from inside of the vehicle, no exterior locking system is required to prevent illegal siphoning of the tank 22. Thus, there is no need for a lock on the fuel door 25.

While the closure 20 has been specifically illustrated in FIG. 1 in conjunction with a vehicle having a hinged fuel door 25, the closure advantageously lends itelf to being installed in a fender in a simpler, more attractive and unobtrusive manner. For example, FIG. 10 shows a fender 23' having a circular hole 70 for receiving an axially longer disc 52' of a closure 20'. The outer side of the disc may be flush with the outer side of the fender while the remainder of the closure is completely concealed behind the fender. When the disc is the same color as the fender, the closure is virtually unnoticeable and the fender is virtually uninterrupted.

From the foregoing, it will be apparent that the present invention brings to the art a new and improved closure which is attached permanently to the filler pipe and which eliminates the need for removing and replacing a conventional screw-on fuel cap. By virtue of the locking ring 50, the flapper 35 is securely sealed in its closed position and may be locked in such position to prevent unauthorized access to the fuel tank 22. When the motor 65 is used in conjunction with the closure, locking and unlocking of the ring may be conveniently and automatically effected from inside the vehicle. Also, the closure may be aesthetically blended with the body of the vehicle.

Those familiar with the art will appreciate that variations may be made to the closure without departing from the spirit of the invention. By way of example, the base 50 could be threadably connected to the filler pipe 31 rather than welded thereto. Also, the flapper 35 could be located on the outer side of the base 30 and the locking ring 50 positioned on the inner side of the base.

I claim:

1. A closure for the outer end portion of the filler pipe of a vehicle fuel tank adapted to be filled by a nozzle inserted into the filler pipe, said closure comprising a base adapted to be fixed to the outer end portion of the filler pipe and having a fill opening therethrough, a valve member mounted on said base and movable between open and closed positions relative to said fill opening, said valve member normally being disposed in said closed position and being moved to said open position by said nozzle as an incident to insertion of said nozzle into the filler pipe, and means for normally locking said valve member in said closed position and selectively movable to release said valve member for movement to said open position by the nozzle.

2. A closure as defined in claim 1 in which said valve member is a flapper pivotally connected to said base to swing between said open and closed positions, and spring means biasing said flapper to said closed position.

3. A closure for the outer end portion of the filler pipe of a vehicle fuel tank adapted to be filled by a nozzle inserted into the filler pipe, said closure comprising a base adapted to be fixed within the outer end portion of the filler pipe and having a fill opening therethrough, a flapper pivotally connected to said base to swing between open and closed positions relative to said opening, said flapper seating against said base and closing said opening when said flapper is in said closed position, a spring biasing said flapper toward said closed position, said flapper being engaged by said nozzle and being swung to said open position by said nozzle when the nozzle is inserted into the outer end portion of said filler pipe, and means for normally locking said flapper in said closed position and selectively movable to release said flapper for swinging to said open position.

4. A closure for the outer end portion of the filler pipe of a vehicle fuel tank adapted to be filled by a nozzle inserted into the filler pipe, said closure comprising a base adapted to be fixed within the outer end portion of the filler pipe and having a fill opening therethrough, a flapper pivotally connected to said base to swing between open and closed positions relative to said opening, said flapper seating against said base and closing said opening when aid flapper is in said closed position, a spring biasing said flapper toward said closed position, said flapper being engaged by said nozzle and being swung to said open position by said nozzle when the nozzle is inserted into the outer end portion of said filler pipe, and means for normally locking said flapper in said closed position and selectively movable to release said flapper for swinging to said open position, said means comprising a locking ring rotatably supported on aid base to turn between first and second positions, said ring engaging said flapper and locking said flapper in said closed position when said ring is in said first position, said ring releasing said flapper for swinging to said open position when said ring is in said second position.

5. A closure as defined in claim 4 further including means on said ring and engageable with said flapper to force said flapper into tight sealing engagement with said base as said ring is turned from said second position to said first position.

6. A closure as defined in claim 4 further including a series of angularly spaced lugs formed on one of said flapper and said ring, a series of angularly spaced notches formed in the other of said flapper and said ring, said lugs and said notches being angularly aligned when said ring is in said second position thereby to permit swinging of said flapper to said open position, said lugs and said notches being angularly misaligned when said ring is in said first position whereby said lugs prevent downward swinging of said flapper to said open position.

7. A closure as defined in claim 6 in which said lugs are formed on said flapper and in which said notches are formed in said ring, said lugs and notches being shaped to cause said notches to cam against said lugs and force said flapper into tight sealing engagement with said base as said ring is turned from said second position to said first position.

8. A closure as defined in claim 6 in which said base has inner and outer sides, said flapper being pivotally connected to the inner side of said base and having a member projecting upwardly through said fill opening, said lugs being formed on said member and being located adjacent the outer side of said base, said ring being rotatably supported on the outer side of said base and encircling said member, and said notches being formed in said ring.

9. A closure as defined in claim 8 in which said lugs and notches are shaped so as to cause said notches to cam against said lugs and draw said flapper outwardly into tight sealing engagement with the inner side of said base as said ring is turned from said second position to said first position.

10. A closure as defined in claim 4 further including reversible power-operated means for rotating said ring between said first and second positions.

11. A closure as defined in claim 10 in which said power-operated means comprise an electric motor having a rotatable output shaft, and gearing between said output shaft and said ring and operable to turn said ring in respone to energization of said motor.

12. A closure for the outer end portion of the filler pipe of a vehicle fuel tank adapted to be filled by a nozzle inserted into the filler pipe, said closure comprising a base adapted to be fixed within the outer end portion of the filler pipe and having a fill opening therethrough, a flapper pivotally connected to said base to swing between open and closed positions relative to said opening, said flapper seating against said base and closing said opening when said flapper is in said closed position, a spring biasing said flapper toward said closed position, said flapper being engaged by said nozzle and being swung to said open position by said nozzle when the nozzle is inserted into the outer end portion of said filler pipe, a series of angularly spaced lugs projecting radially from said flapper, a locking ring rotatably supported on said base to turn between locked and unlocked positions, a series of angularly spaced notches formed in said locking ring and angularly misaligned with said lugs when said ring is in said locked position, said lugs engaging said ring when said ring is in said locked position and preventing said flapper from swinging to said open position, said notches being angularly aligned with said lugs when said ring is in said unlocked position and permitting said lugs to move from said notches to enable said flapper to swing to said open position.

13. A closure as defined in claim 12 in which said lugs and notches are shaped so as to cause said notches to cam against said lugs and force said flapper into tight sealing engagement with said base as said ring is turned from said unlocked position to said locked position.

* * * * *